US012793488B2

(12) United States Patent
Wu

(10) Patent No.: US 12,793,488 B2
(45) Date of Patent: Nov. 10, 2026

(54) LOCKER MANAGEMENT METHOD, ELECTRONIC DEVICE AND COMPUTER READABLE STORAGE MEDIUM

(71) Applicant: Nanning FuLian FuGui Precision Industrial Co., Ltd., Nanning (CN)

(72) Inventor: Jin-Long Wu, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 23 days.

(21) Appl. No.: 19/006,611

(22) Filed: Dec. 31, 2024

(65) Prior Publication Data

US 2026/0188066 A1 Jul. 2, 2026

(51) Int. Cl.
*G07C 9/00* (2020.01)

(52) U.S. Cl.
CPC ..... *G07C 9/00896* (2013.01); *G07C 9/00563* (2013.01); *G07C 9/00817* (2013.01); *G07C 2009/00404* (2013.01); *G07C 2009/00769* (2013.01)

(58) Field of Classification Search
CPC ............ G07C 9/00896; G07C 9/00563; G07C 9/00817; G07C 2009/00404; G07C 2009/00769
USPC .......................................................... 340/5.52
See application file for complete search history.

(56) References Cited

U.S. PATENT DOCUMENTS

| | | | | | |
|---|---|---|---|---|---|
| 9,024,720 | B2 * | 5/2015 | Bliding | H04W 4/80 340/5.71 |
| 9,648,017 | B2 * | 5/2017 | Wenninger | H04L 63/102 |
| 10,504,313 | B2 * | 12/2019 | Dautz | G06Q 20/327 |
| 10,931,667 | B2 * | 2/2021 | Krishan | G06F 21/45 |
| 12,380,749 | B2 * | 8/2025 | Conrad | H04W 12/04 |
| 12,424,081 | B2 * | 9/2025 | Wright | G08B 13/19602 |
| 2012/0222103 | A1 * | 8/2012 | Bliding | H04W 4/80 726/7 |
| 2013/0179692 | A1 * | 7/2013 | Tolba | H04L 63/0861 713/179 |
| 2016/0050191 | A1 * | 2/2016 | Alt | H04L 63/108 726/4 |

(Continued)

FOREIGN PATENT DOCUMENTS

| | | |
|---|---|---|
| CN | 111080922 A | 4/2020 |
| CN | 118609274 A | 9/2024 |

(Continued)

*Primary Examiner* — Nam V Nguyen
(74) *Attorney, Agent, or Firm* — ScienBiziP, P.C.

(57) ABSTRACT

A locker management method is disclosed. When an item deposit request is received, an authentication link message is sent to a first mobile device to obtain a first phone number. An authentication message including a first one-time password (OTP) is sent to the first mobile device according to the first phone number to perform a first OTP authentication. When passing the first OTP authentication, the first mobile device is requested to perform biometric authentication to generate and store a mobile private key in the first mobile device. The mobile private key is used to switch an electronic lock of the locker from an unlocked state to a locked state or from the locked state to the unlocked state. When an item deposit complete instruction is received from the first mobile device, the electronic lock of the locker is switched from the unlocked state to the locked state.

6 Claims, 5 Drawing Sheets

(56) References Cited

U.S. PATENT DOCUMENTS

| | | | | |
|---|---|---|---|---|
| 2017/0236350 | A1* | 8/2017 | Lin | G07C 9/00309 340/5.61 |
| 2023/0091394 | A1 | 3/2023 | Yi et al. | |
| 2024/0127655 | A1 | 4/2024 | Wright et al. | |

FOREIGN PATENT DOCUMENTS

| | | | | |
|---|---|---|---|---|
| CN | 119028048 | A | 11/2024 | |
| WO | WO-2020100014 | A1 * | 5/2020 | G06Q 10/08 |

* cited by examiner

LOCKER MANAGEMENT METHOD, ELECTRONIC DEVICE AND COMPUTER READABLE STORAGE MEDIUM

FIELD

The disclosure relates to network management, and more particularly to a locker management method, an electronic device and a computer readable storage medium.

BACKGROUND

Currently, most lockers installed in stations on the market use display modules with touch functions for users to operate and list the locker usage status. When a user selects a locker, puts the items in the locker and locks the locker, a machine connecting to the locker prints a password slip for the user, so that the user can enter the password in the machine to pick up the stored items. However, the password slip may be lost, and the panel of the display module is prone to failure, and there may be hygiene concerns in a long-term operation.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
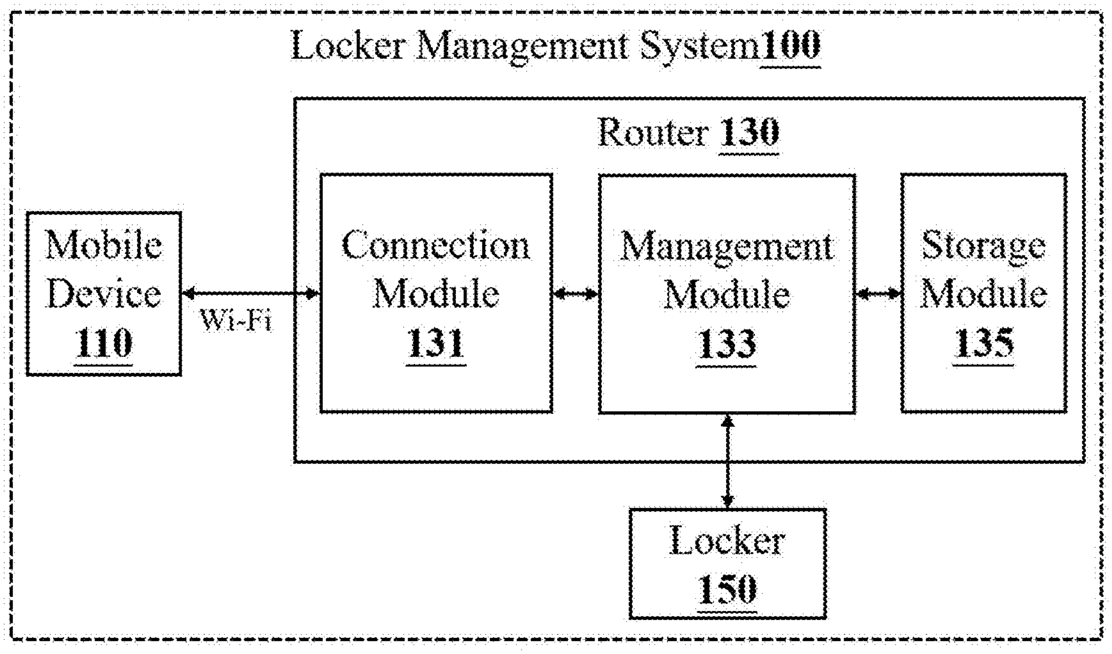
FIG. 1 is a block diagram of an embodiment of an architecture of a locker management system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 is a block diagram of an embodiment of the architecture of a locker management system of the present disclosure.

The embodiment of the locker management system 100 comprises a mobile device 110, a router 130 and a locker 150. The router 130 further comprises a connection module 131, a management module 133 and a storage module 155. The mobile device 110 can be any communication device with wireless networking capabilities, such as a smartphone.

Figure 2:
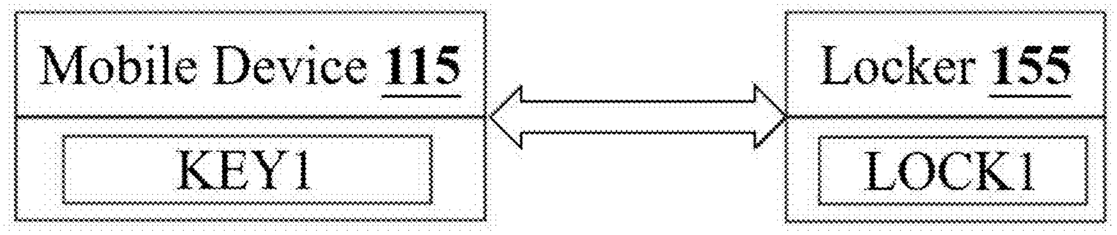
FIG. 2 is a block diagram of an embodiment of an application of the locker management system of the present disclosure.

FIG. 2 is a block diagram of an embodiment of an application of a locker management system of the present disclosure.

Referring to FIG. 2, in this embodiment, through biometric authentication, such as fingerprint identification or facial recognition, of a mobile device 115, for example, a smartphone or any other device with a wireless networking function, a mobile private key KEY1 is stored in the mobile device 115 of a user, and a locker 155 stores storage a private keys LOCK1 corresponding to the mobile private key KEY1. When the user want to pick up items or operate the locker 155, the user performs the biometric authentication through the mobile device 115 to obtain the mobile private key KEY1, and the locker 155 can be opened or operated by an operation command when the mobile private key KEY1 is matched with the storage private key LOCK1.

Referring to FIG. 1, when a user A wants to store an item, he selects a locker, for example, the locker 150, and connects to the connection module 131 of the router 130 through the mobile device 110. As the connection is successful, the management module 133 sends an authentication link message to the mobile device 110 of the user A. The user A connects to an authentication webpage provided by the management module 133 in the authentication link message through the mobile device 110, and enters a first phone number on the authentication webpage. For example, when the mobile device 110 is a smartphone, the first phone number input by the user A is the phone number of the smartphone. After inputting the first phone number, the management module 133 sends a first one-time password (OTP) authentication message to the mobile device 110 of the user A. The first OTP authentication message includes a first OTP. The user A enters the first OTP provided in the first OTP authentication message on the authentication webpage to perform OTP authentication.

After passing the OTP authentication, the management module 133 notifies the user A to perform the biometric authentication. After the user A completes the biometric authentication through the mobile device 110, a mobile private key is generated, for example, KEY1 as shown in FIG. 2. The mobile private key is stored in the mobile device 110 and can be used to switch an electronic lock (not shown) of the locker 150 from an unlocked state to a locked state or from the locked state to the unlocked state. At the same time, the management module 133 generates a storage private key corresponding to the first phone number, for example, LOCK1 as shown in FIG. 2. The first telephone number and the storage private key are stored in the storage module 135.

At this time, the management module 133 switches the electronic lock of the locker 150 from the locked state to the unlocked state. The user A opens the locker 150 to deposit his items, and, after completing the item deposit, sends an item deposit complete instruction through the mobile device 110. The management module 133 receives the item deposit complete instruction and then switches the electronic lock of the locker 150 from the unlocked state to the locked state.

As picking up the items is needed, a user B selects the locker 150 and connects to the connection module 131 through his mobile device. After the connection is successful, the management module 133 sends the authentication link message to user B's mobile device. The user B connects to the authentication webpage provided by the management module 133 in the authentication link message through his mobile device and enters a second phone number in the authentication webpage.

The management module 133 determines whether the second phone number is the first phone number in the storage module 135. If the second phone number is determined as the first phone number, indicating that the user B is the user A, then user A is requested to perform another OTP authentication and biometric authentication. After passing the another OTP authentication and the biometric authentication, the mobile device 110 sends the mobile private key to the management module 133. The management module 133 matches the mobile private key in the mobile device 110 with the storage private key in the storage module 135, and opens the locker 150, after the matching is successful, to allow the user A to take the items. At this time, the management module 133 switches the electronic lock of the locker 150 from the locked state to the unlocked state.

If the second phone number is determined as not the first phone number, the management module 133 sends the authentication link message to the mobile device 110 of the user A. The user A logs into the authentication webpage through the authentication link message and clicks the "Agree to allow others to open the locker" option after passing the biometric authentication, causing the mobile device 110 to transmit the mobile private key to the management module 133. The management module 133 receives the "agree instruction" and the mobile private key, confirms that the mobile private key matches the storage private key, and then sends a second OTP message to the user B. The user B enters a second OTP provided in the second OTP authentication message on the authentication web page to perform OTP authentication. After passing the OTP authentication, the management module 133 opens the locker 150 that switches the electronic lock of the locker 150 from the locked state to the unlocked state, so that the user B can take the items.

Figure 3:
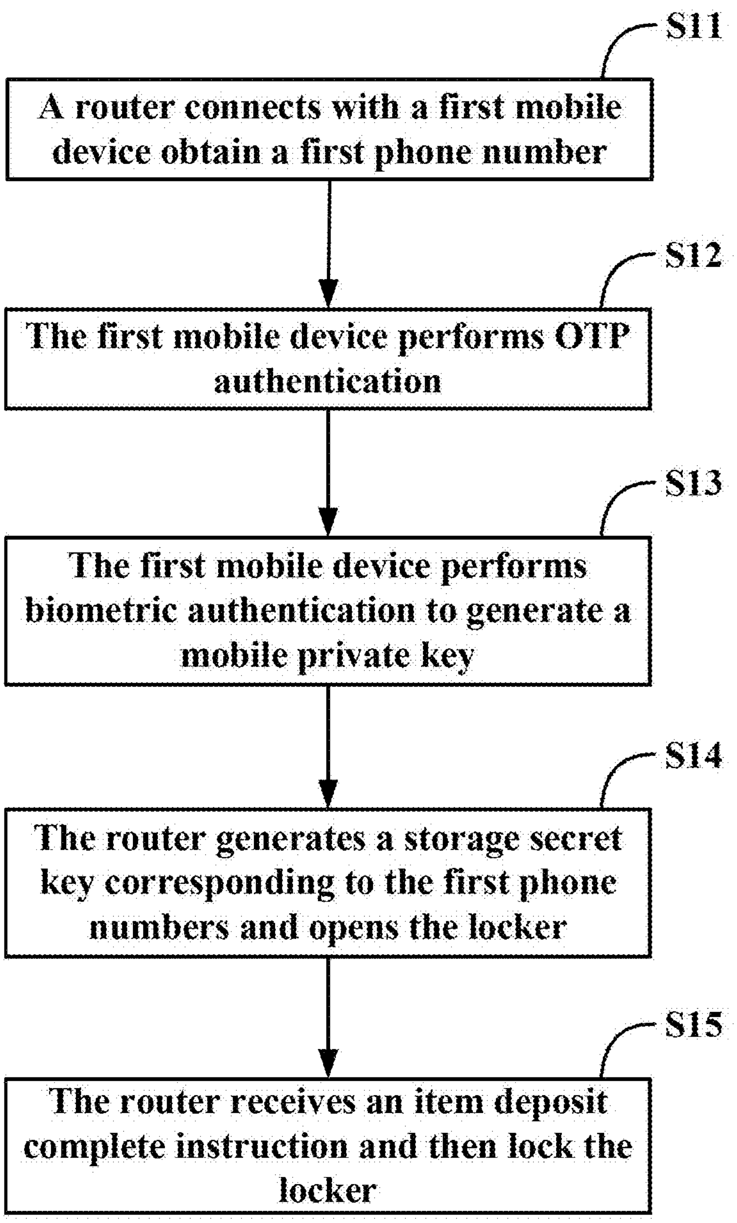
FIG. 3 is a flowchart of a first embodiment of a locker management method of the present disclosure, showing a procedure to store items.

FIG. 3 is a flowchart of a first embodiment of a locker management method of the present disclosure, claiming the procedure for storing item. According to different needs, the order of the steps in the flowchart can be changed, and some steps can be omitted.

In step S11, when a first user selects a locker, a router connects with a first mobile device of the first user and sends an authentication link message to the first mobile device of the first mobile device to obtain a first phone number. The first user connects to the authentication webpage provided by the router in the authentication link message through the first mobile device and enters the first phone number in the authentication webpage.

In step S12, the router obtains the first phone number and sends a first OTP authentication message to the first user for OTP authentication, the first OTP authentication message includes a first OTP. The first user enters the first OTP in the first OTP authentication message on the authentication webpage to perform the OTP authentication.

In step S13, after the first user passes the OTP authentication, the router requests the first user to perform the biometric authentication, for example, fingerprint identification or facial recognition, to generate a mobile private key. The mobile private key is stored in the first mobile device. The mobile private key can be used to switch the electronic lock of the locker from the unlocked state to the locked state or from the locked state to the unlocked state.

In step S14, the router generates a storage secret key corresponding to the first phone numbers and opens the locker to switch the electronic lock of the locker from the locked state to the unlocked state. The first phone number and the storage private key are stored in the router.

In step S15, the first user opens the locker to deposit his items, and after completing the item deposit, sends an item deposit complete instruction through the first mobile device. The router receives the item deposit complete instruction and then switches the electronic lock of the locker 150 from the unlocked state to the locked state.

Figure 4:
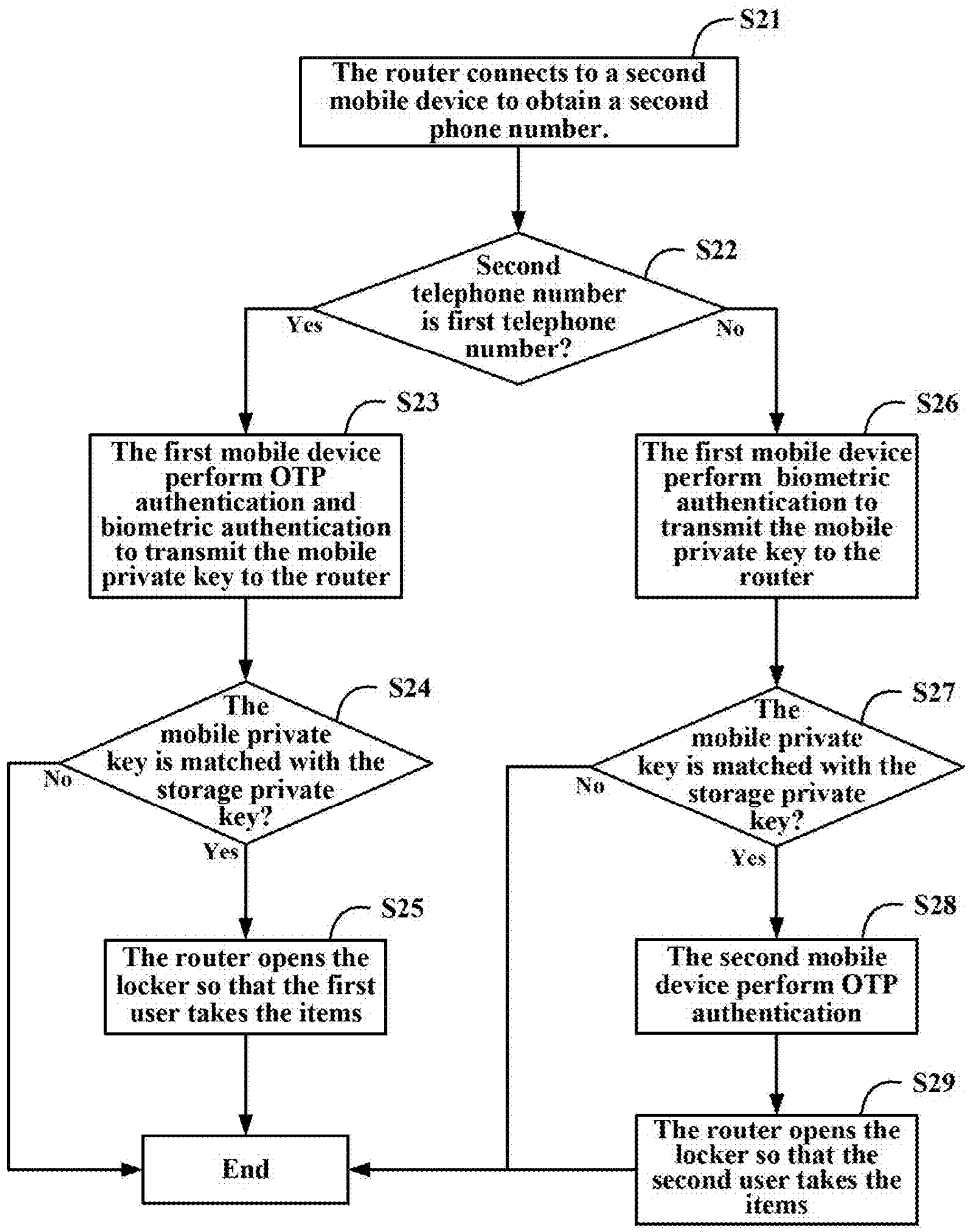
FIG. 4 is a flowchart of a second embodiment of a locker management method of the present disclosure, showing a procedure to remove the items.

FIG. 4 is a flowchart of a second embodiment of a locker management method of the present disclosure, claiming the procedure for taking the item. According to different needs, the order of the steps in the flowchart can be changed, and some steps can be omitted.

In step S21, a second user selects the locker, the router connects to a second mobile device of the second user and sends the authentication link message to the second mobile device of the second user to obtain a second phone number. The second user connects to the authentication webpage provided by the router in the authentication link message through the second mobile device and enters the second phone number on the authentication webpage.

In step S22, the router determines whether the second telephone number is the first telephone number.

In step S23, if the second phone number is determined as the first phone number, indicating that the second user is the first user, the router requests the first user to perform another OTP authentication and biometric authentication. After passing the another OTP authentication and biometric authentication, the first mobile device transmits the mobile private key to the router.

In step S24, the router determines whether the mobile private key is matched with the storage private key. If they are not matched, the process is terminated.

In step S25, if the mobile private key is matched with the storage private key, the router opens the locker that switches the electronic lock of the locker from the locked state to the unlocked state, so that the first user can take the items.

In step S26, if the second phone number is determined as not the first phone number, the router sends the authentication link message to the first mobile device of the first user to perform another biometric authentication. When the first mobile device passes the another biometric authentication, the mobile private key is sent to the router. The first user logs into the authentication webpage through the authentication link message to perform the another biometric authentication. After passing the biometric authentication, the first user clicks the "Agree to allow others to open the locker" option, so that the first mobile device transmits the mobile private key to the router.

In step S27, the router receives the "agree instruction" and the mobile private key and determines whether the mobile private key matches the storage private key. If they are not matched, the process is terminated.

In step S28, if the mobile private key matches the storage private key, the router sends a second OTP message to the second user for the OTP authentication. The second OTP authentication message includes a second OTP. The second user enters the second OTP provided by the second OTP authentication message on the authentication webpage to perform the OTP authentication.

In step S29, after the second user passes the OTP authentication, the router opens the locker that switches the electronic lock of the locker from the locked state to the unlocked state, so that the second user can take the items.

Figure 5:
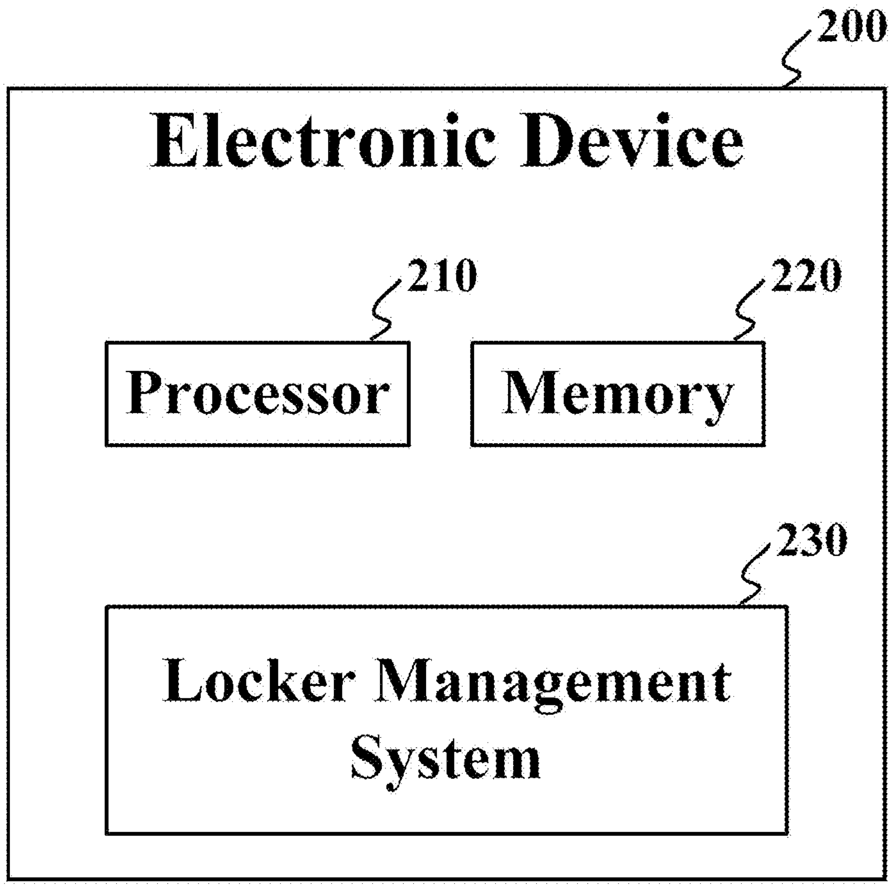
FIG. 5 is a block diagram of an embodiment of a hardware architecture of an electronic device using the locker management methods of the present disclosure.

FIG. 5 is a block diagram of an embodiment of the hardware architecture of an electronic device using the locker management method of the present disclosure. The electronic device 200 may be, but is not limited to, connected to a processor 210, a memory 220, and a locker management system 230 via system buses. The electronic device 200 shown in FIG. 5 may include more or fewer components than those illustrated or may combine certain components.

The memory 220 stores a computer program, such as the locker management system 230, which is executable by the processor 210. When the processor 210 executes the locker management system 230, the blocks in one embodiment of the booting mode configuration method applied in the electronic device 200 are implemented, such as blocks S11 to S15 and S21 to S29 shown in FIGS. 3 and 4.

It will be understood by those skilled in the art that FIG. 5 is merely an example of the electronic device 200 and does not constitute a limitation to the electronic device 200. The electronic device 200 may include more or fewer components than those illustrated or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the locker management system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The locker management system 230 can be partitioned into one or more modules/units that are stored in the memory 220 and executed by the processor 210. The one or more modules/units may be a series of computer program instructions capable of performing particular functions of the locker management system 230.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A locker management method executable by an electronic device, the locker management method comprising:

receiving an item deposit request by a locker from a first mobile device, connecting to the first mobile device according to the item deposit request and sending an authentication link message to the first mobile device to obtain a first phone number corresponding to the first mobile device;

sending an authentication message including a first one-time password (OTP) to the first mobile device according to the first phone number to perform a first OTP authentication;

when the first mobile device passes the first OTP authentication, requesting the first mobile device to perform biometric authentication to generate and store a mobile private key in the first mobile device, wherein the locker switches an electronic lock of the locker, with the mobile private key, from an unlocked state to a locked state or from the locked state to the unlocked state;

when an item deposit complete instruction is received from the first mobile device, switching the electronic lock of the locker from the unlocked state to the locked state;

receiving an item taking request, by the locker, from a second mobile device, connecting to the second mobile device according to the item taking request and sending the authentication link message to the second mobile device to obtain a second phone number;

determining whether the second phone number is the first phone number;

if the second phone number is determined as the first phone number, requesting the first user to perform the OTP authentication and biometric authentication;

when the first mobile device passes the OTP authentication and biometric authentication, obtaining the mobile private key from the first mobile device and matching the mobile private key with the storage private key;

when the mobile private key and the storage private key are successfully matched, switching the electronic lock of the locker from the locked state to the unlocked state;

receiving an item taking request, by the locker, from a second mobile device, connecting to the second mobile device according to the item taking request and sending the authentication link message to the second mobile device to obtain a second phone number;

determining whether the second phone number is the first phone number;

if the second phone number is determined as the first phone number, requesting the first user to perform the OTP authentication and biometric authentication;

when the first mobile device passes the OTP authentication and biometric authentication, obtaining the mobile private key from the first mobile device and matching the mobile private key with the storage private key; and when the mobile private key and the storage private key are successfully matched, switching the electronic lock of the locker from the locked state to the unlocked state.

2. The method of claim 1, further comprising:

when the first mobile device passes the biometric authentication and an option of "Agree to allow others to open the locker" is triggered, retrieving the mobile private key and the agree instruction from the first mobile device.

3. An electronic device comprising a memory, a processor, and a serial number length adjustment program stored in the memory and operable on the processor, wherein the locker management program is executed by the processor, the electronic device is instructed to implement following instructions:

receiving an item deposit request from a first mobile device to a locker, connecting to the first mobile device according to the item deposit request and sending an authentication link message to the first mobile device to obtain a first phone number corresponding to the first mobile device;

sending an authentication message including a first one-time password (OTP) to the first mobile device according to the first phone number to perform a first OTP authentication;

when the first mobile device passes the first OTP authentication, requesting the first mobile device to perform biometric authentication to generate and store a mobile private key in the first mobile device, wherein the locker switches an electronic lock of the locker, with the mobile private key, from an unlocked state to a locked state or from the locked state to the unlocked state;

when an item deposit complete instruction is received from the first mobile device, switching the electronic lock of the locker from the unlocked state to the locked state;

receiving an item taking request, by the locker, from a second mobile device, connecting to the second mobile device according to the item taking request and sending the authentication link message to the second mobile device to obtain a second phone number;

determining whether the second phone number is the first phone number;

if the second phone number is determined as the first phone number, requesting the first user to perform the OTP authentication and biometric authentication;

when the first mobile device passes the OTP authentication and biometric authentication, obtaining the mobile private key from the first mobile device and matching the mobile private key with the storage private key;

when the mobile private key and the storage private key are successfully matched, switching the electronic lock of the locker from the locked state to the unlocked state;

receiving an item taking request, by the locker, from a second mobile device, connecting to the second mobile device according to the item taking request and sending the authentication link message to the second mobile device to obtain a second phone number;

determining whether the second phone number is the first phone number;

if the second phone number is determined as the first phone number, requesting the first user to perform the OTP authentication and biometric authentication;

when the first mobile device passes the OTP authentication and biometric authentication, obtaining the mobile private key from the first mobile device and matching the mobile private key with the storage private key; and when the mobile private key and the storage private key are successfully matched, switching the electronic lock of the locker from the locked state to the unlocked state.

4. The device of claim 3, wherein the locker management program is further executed by the processor to implement following steps:

when the first mobile device passes the biometric authentication and an option of "Agree to allow others to open the locker" is triggered, retrieving the mobile private key and the agree instruction from the first mobile device.

5. A non-transitory computer-readable storage medium storing game program which causes a computer to execute:

a process of receiving an item deposit request from a first mobile device to a locker, connecting to the first mobile device according to the item deposit request and sending an authentication link message to the first mobile device to obtain a first phone number corresponding to the first mobile device;

a process of sending an authentication message including a first one-time password (OTP) to the first mobile device according to the first phone number to perform a first OTP authentication;

a process of, when the first mobile device passes the first OTP authentication, requesting the first mobile device to perform biometric authentication to generate and store a mobile private key in the first mobile device, wherein the locker switches an electronic lock of the locker, with the mobile private key, from an unlocked state to a locked state or from the locked state to the unlocked state;

a process of, when an item deposit complete instruction is received from the first mobile device, switching the electronic lock of the locker from the unlocked state to the locked state;

a process of receiving an item taking request from a second mobile device to the locker, connecting to the second mobile device according to the item taking request and sending the authentication link message to the second mobile device to obtain a second phone number;

a process of determining whether the second phone number is the first phone number;

a process of, if the second phone number is determined as the first phone number, requesting the first user to perform another OTP authentication and biometric authentication;

a process of, when the first mobile device passes the another OTP authentication and biometric authentication, obtaining the mobile private key from the first mobile device and matching the mobile private key with the storage private key;

a process of, when the mobile private key and the storage private key are successfully matched, switching the electronic lock of the locker from the locked state to the unlocked state;

a process of, if the second phone number is determined as not the first phone number, sending the authentication link message to the first mobile device for another biometric authentication;

a process of, when the first mobile device passes the biometric authentication, retrieving the mobile private key and an agree instruction from the first mobile device;

a process of determining whether the mobile private key is matched with the storage private key;

a process of, if the mobile private key is matched with the storage private key, sending an authentication message including a second OTP to the second mobile device to perform a second OTP authentication; and a process of, when the second mobile device passes the second OTP authentication, switching the electronic lock of the locker from the locked state to the unlocked state.

6. The storage medium of claim 5, storing game program which causes a computer to execute:

a process of, when the first mobile device passes the biometric authentication and an option of "Agree to allow others to open the locker" is triggered, retrieving the mobile private key and the agree instruction from the first mobile device.

* * * * *